(12) United States Patent
Tsai

(10) Patent No.: US 7,664,540 B2
(45) Date of Patent: Feb. 16, 2010

(54) BLUETOOTH EARPHONE SET WITH WIRE CONTROL FUNCTION

(76) Inventor: Jin-Chou Tsai, 18/F., No. 95, Roosevelt Rd., Sec. 2, Taipei City (TW)

( * ) Notice: Subject to any disclaimer, the term of this patent is extended or adjusted under 35 U.S.C. 154(b) by 874 days.

(21) Appl. No.: 11/377,345

(22) Filed: Mar. 17, 2006

(65) Prior Publication Data

US 2007/0218962 A1  Sep. 20, 2007

(51) Int. Cl.
*H04M 1/00* (2006.01)
(52) U.S. Cl. .................................. 455/575.2; 455/90.1
(58) Field of Classification Search ............. 455/550.1, 455/556.1, 575.1, 575.2, 575.6, 90.1, 90.3
See application file for complete search history.

(56) References Cited

U.S. PATENT DOCUMENTS 7,542,721 B1* 6/2009 Bonner et al. .............. 455/41.2
2003/0142817 A1* 7/2003 Liao ....................... 379/428.01

* cited by examiner

*Primary Examiner*—Sam Bhattacharya
(74) *Attorney, Agent, or Firm*—Rosenberg, Klein & Lee

(57) ABSTRACT

A Bluetooth earphone set, which includes a main unit that houses an auto-reversible first winding mechanism and an auto-reversible second winding mechanism, an earphone cable coupled to the auto-reversible first winding mechanism for voice output, a signal connector cable coupled to the auto-reversible second winding mechanism and connectable to a cell phone, a switch, which is switched between a first position for enabling the earphone cable to output voice signal that is received wirelessly from a cell phone by the main unit and a second position for enabling the earphone to output voice signal that is received from a cell phone through the signal connector cable.

18 Claims, 9 Drawing Sheets

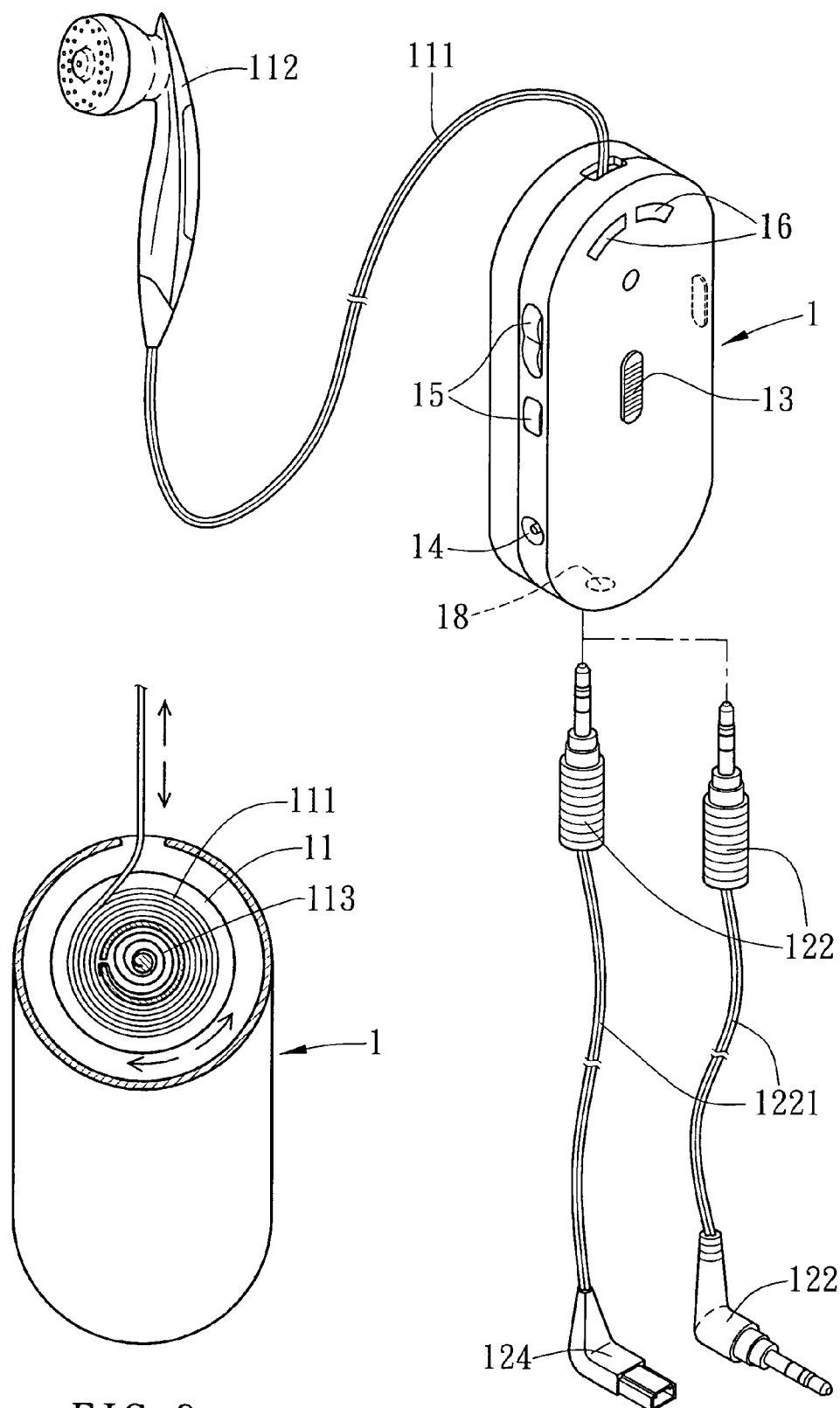

BLUETOOTH EARPHONE SET WITH WIRE CONTROL FUNCTION

BACKGROUND OF THE INVENTION

1. Field of the Invention

The present invention relates to an earphone set and more particularly, to a Bluetooth earphone set, which can be selectively set between a first position to receive voice signal from a cell phone wirelessly and a second position to receive voice signal from a cell phone through a cable.

2. Description of the Related Art

FIG. 11 shows a conventional Bluetooth earphone set, which comprises a main unit 2 and an earphone 21 formed integral with the main unit 2. When in use, the earphone 21 is inserted into the user's ear, and the main unit 2 starts communication with the cell phone wirelessly subject to Bluetooth protocol. According to this design, the user's ear will feel uncomfortable when keeping the earphone 21 in the ear for a long period. Further, keeping the earphone 21 in the ear leaves a very bad impression to the beholder.

FIG. 12 shows another conventional design of Bluetooth earphone set. According to this design, the Bluetooth earphone set comprises a main unit 3, an earphone 32, a cable 31 connected between the earphone 32 and the main unit 3, and a microphone 311 mounted on the cable 31. This design of Bluetooth earphone set is comfortable in use. However, when the earphone 32 is not inserted into the user's ear, the cable 31 tends to be tangled.

Further, when the battery power of the main unit of either of the aforesaid two conventional earphone set designs is low, the Bluetooth earphone set must be recharged. During charging, the Bluetooth earphone set cannot be used. When the user is driving a car and when the Bluetooth earphone set is under charging, the user shall have to hold the cell phone for communication.

SUMMARY OF THE INVENTION

The present invention has been accomplished under the circumstances in view. It is the main object of the present invention to provide a Bluetooth earphone set, which can be used to receive voice signal from a cell phone wirelessly as well as through a cable. It is another object of the present invention to provide a Bluetooth earphone set, which is operable when charging the battery.

In one embodiment of the present invention, the Bluetooth earphone set comprises a main unit that houses an auto-reversible first winding mechanism and an auto-reversible second winding mechanism, an earphone cable coupled to the auto-reversible first winding mechanism for voice output, a signal connector cable coupled to the auto-reversible second winding mechanism and connectable to a cell phone, a switch, which is switched between a first position for enabling the earphone cable to output voice signal that is received wirelessly from a cell phone by the main unit and a second position for enabling the earphone to output voice signal that is received from a cell phone through the signal connector cable. The main unit further has a power jack for receiving a charging cable to charge the internal battery.

In another embodiment of the present invention, the Bluetooth earphone set comprises a main unit that houses an auto-reversible winding mechanism, an earphone cable coupled to the auto-reversible winding mechanism for voice output, a signal jack provided at the main unit, a detachable signal connector cable for connecting to a cell phone to the signal jack, a switch, which is switched between a first position for enabling the earphone cable to output voice signal that is received wirelessly from a cell phone by the main unit and a second position for enabling the earphone to output voice signal that is received from a cell phone through the signal jack via the signal connector cable.

BRIEF DESCRIPTION OF THE DRAWINGS

FIG. 5 is a schematic drawing showing a Bluetooth earphone set in accordance with a third embodiment of the present invention.

FIG. 6 is a schematic sectional view showing the winding operation of the reel in the main unit of the Bluetooth earphone set in accordance with the third embodiment of the present invention.

DETAILED DESCRIPTION OF THE PREFERRED EMBODIMENT

Figure 1:
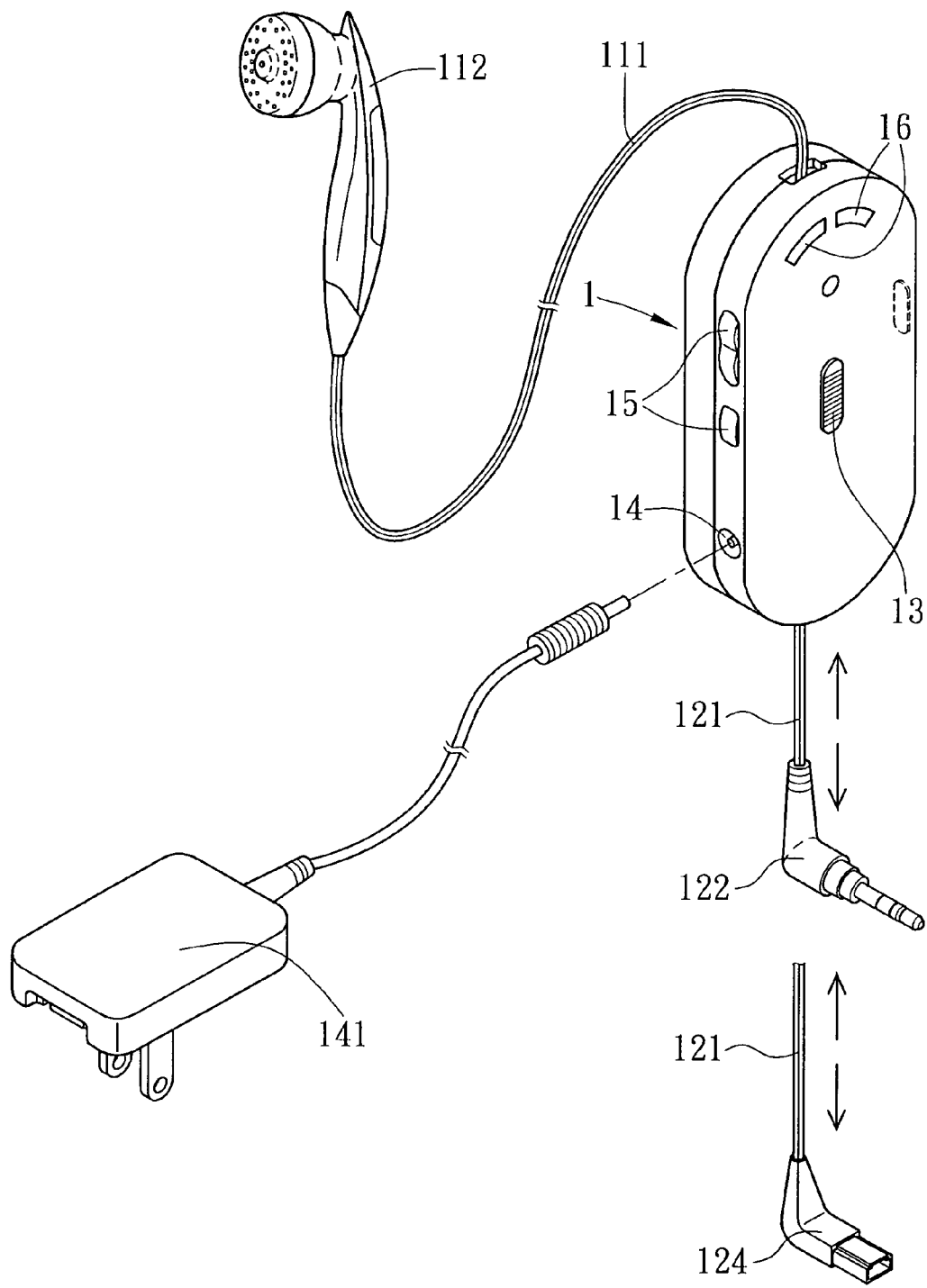
FIG. 1 is a schematic drawing showing a Bluetooth earphone set in accordance with a first embodiment of the present invention.
Figure 2:
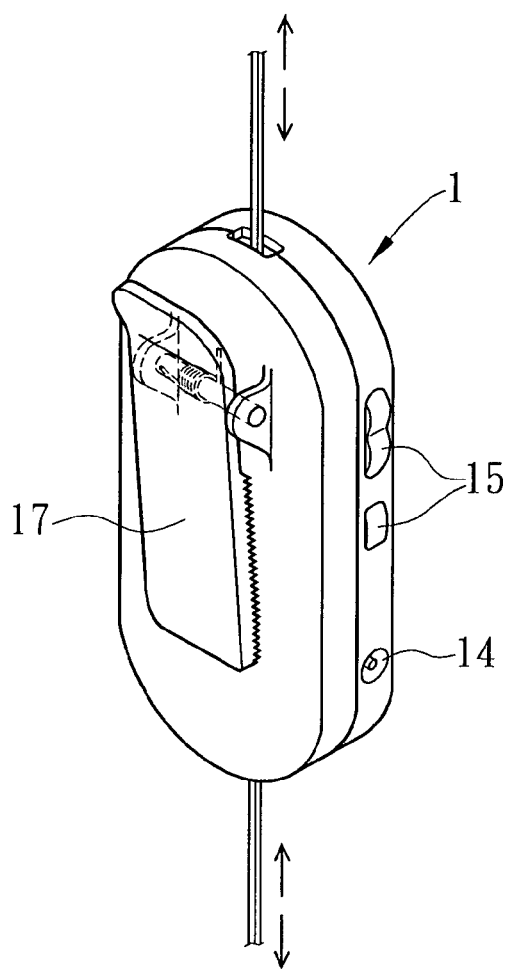
FIG. 2 is an oblique back elevation of the main unit of the Bluetooth earphone set in accordance with the first embodiment of the present invention.
Figure 3:
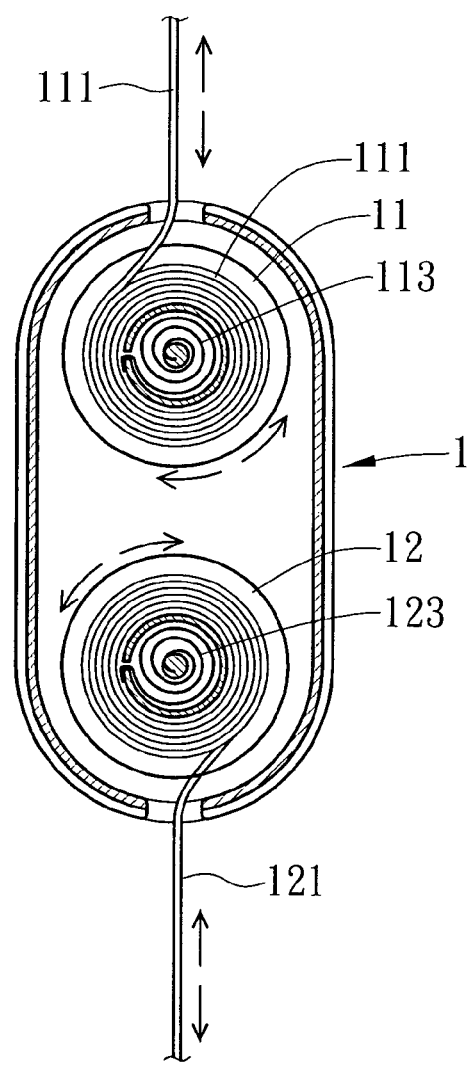
FIG. 3 is a schematic sectional view showing the winding operation of the two reels in the main unit of the Bluetooth earphone set in accordance with the first embodiment of the present invention.

Referring to FIGS. 1~3, a Bluetooth earphone set in accordance with a first embodiment of the present invention is shown comprising a main unit 1. A first reel 11 and a second reel 12 are respectively pivotally mounted inside the main unit 1. A first winding spring 113 and a second winding spring 123 are mounted inside the main unit 1 and adapted to impart a biasing force to the first reel 11 and the second reel 12 respectively. A first cable 111 is wound round the first reel 11, having one end electrically connected to the internal circuit of the main unit 1 and the other end extending out of the main unit 1 and terminating in a earphone 112. A second cable 121 is wound round the second reel 12, having one end electrically connected to the internal circuit of the main unit 1 and the other end extending out of the main unit 1 and terminating in a signal connector 122 or 124 that is connectable to the earphone jack of a cell phone (the signal connectors 122 and 124 fit different cell phones). The first reel 11 and the second reel 12 are ratchet wheels (each fitted with a ratchet and a pawl). The winding springs 113 and 123 and the reels 11 and 12 are so arranged that the cables 111 and 121 are kept wound round the associating reels 11 and 12, keeping the earphone 112 and the signal connector 122 or 124 respectively stopped against the outside wall of the main unit 1. When in use, the user can pull the earphone 112 or the signal connector 122 or 124 outwards from the main unit 1 to the desired distanced and then insert the earphone 112 into the ear or connect the signal connector 122 to the earphone jack of the cell phone. When unlocked the reel 11 or 12, the winding spring 113 or 123 automatically reverses the associating reel 11 or 12 to roll up the associating cable 111 or 121. The main unit 1 has a switch 13, which can be switched to electrically connect the voice input contact to the cable 121. According to this embodiment, the switch 13 can be switched between a first position for enabling the earphone 112 to output voice signal that is received wirelessly by the main unit 1, and a second position for enabling the earphone 112 to output voice signal that is received from a cell phone through the cable 121. The main unit 1 further has a clip 17 at the back side for fastening, function control keys 15, operation status indicator lights 16, and a power jack 14. A battery charger 141 is connectable to the power jack 14 for charging the battery of the main unit 1 with an external power source.

Figure 4:
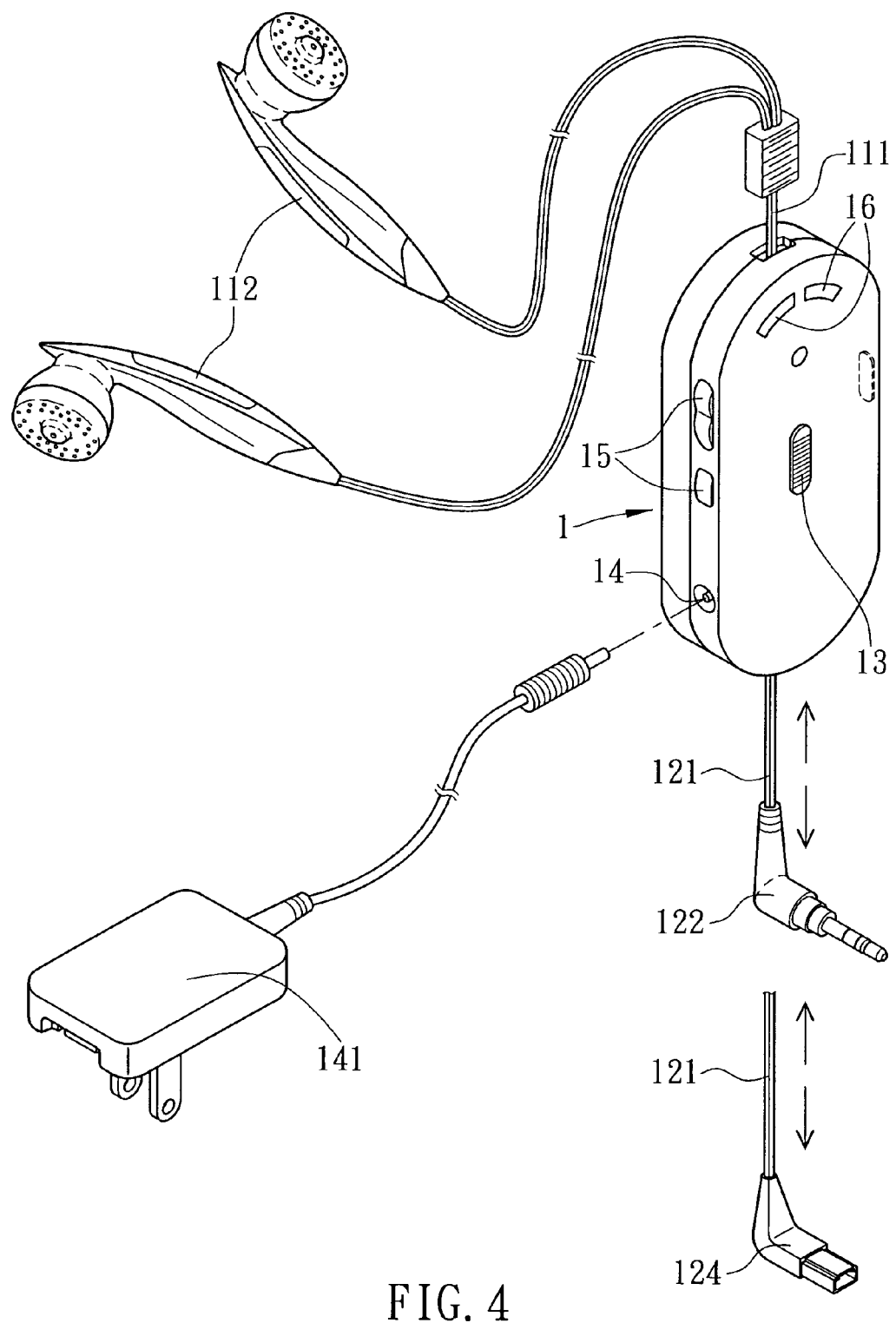
FIG. 4 is a schematic drawing showing a Bluetooth earphone set in accordance with a second embodiment of the present invention.

FIG. 4 shows a Bluetooth earphone set in accordance with a second embodiment of the present invention. This embodiment is substantially similar to the aforesaid first embodiment with the exception that the first cable 111 is a double-wire cable with two earphones 112 respectively provided at the end of each of the two wires.

FIGS. 5 and 6 show a Bluetooth earphone set in accordance with a third embodiment of the present invention. According to this embodiment, one reel 11 and one winding spring 113 are provided inside the main unit 1 to automatically rolled up the cable 111 that has an earphone 112 at the end. The main unit 1 has a signal jack 18 for receiving a detachable signal connector cable 1221. The detachable signal connector cable 1221 has a first signal connector 122 at one end for connection to the signal jack 18, and a second signal connector 122 or 124 at the other end for connection to a cell phone. The switch 13 of the main unit 1 can be switched between a first position for enabling the earphone 112 to output voice signal that is received wirelessly by the main unit 1 and a second position for enabling the earphone 112 to output voice signal that is received from a cell phone through the signal jack 18 and the signal connector cable 1221.

Figure 7:
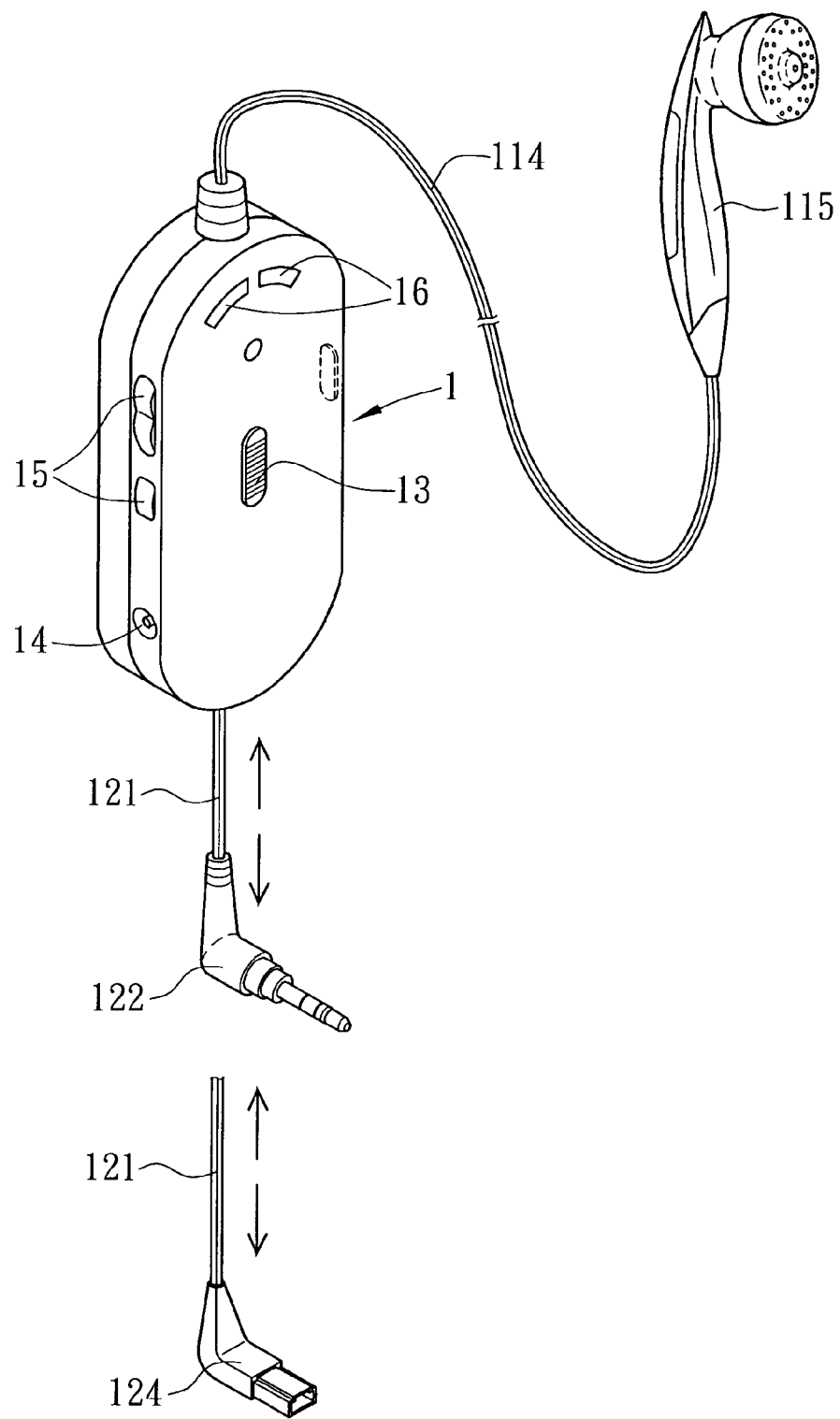
FIG. 7 is a schematic drawing showing a Bluetooth earphone set in accordance with a fourth embodiment of the present invention.
Figure 8:
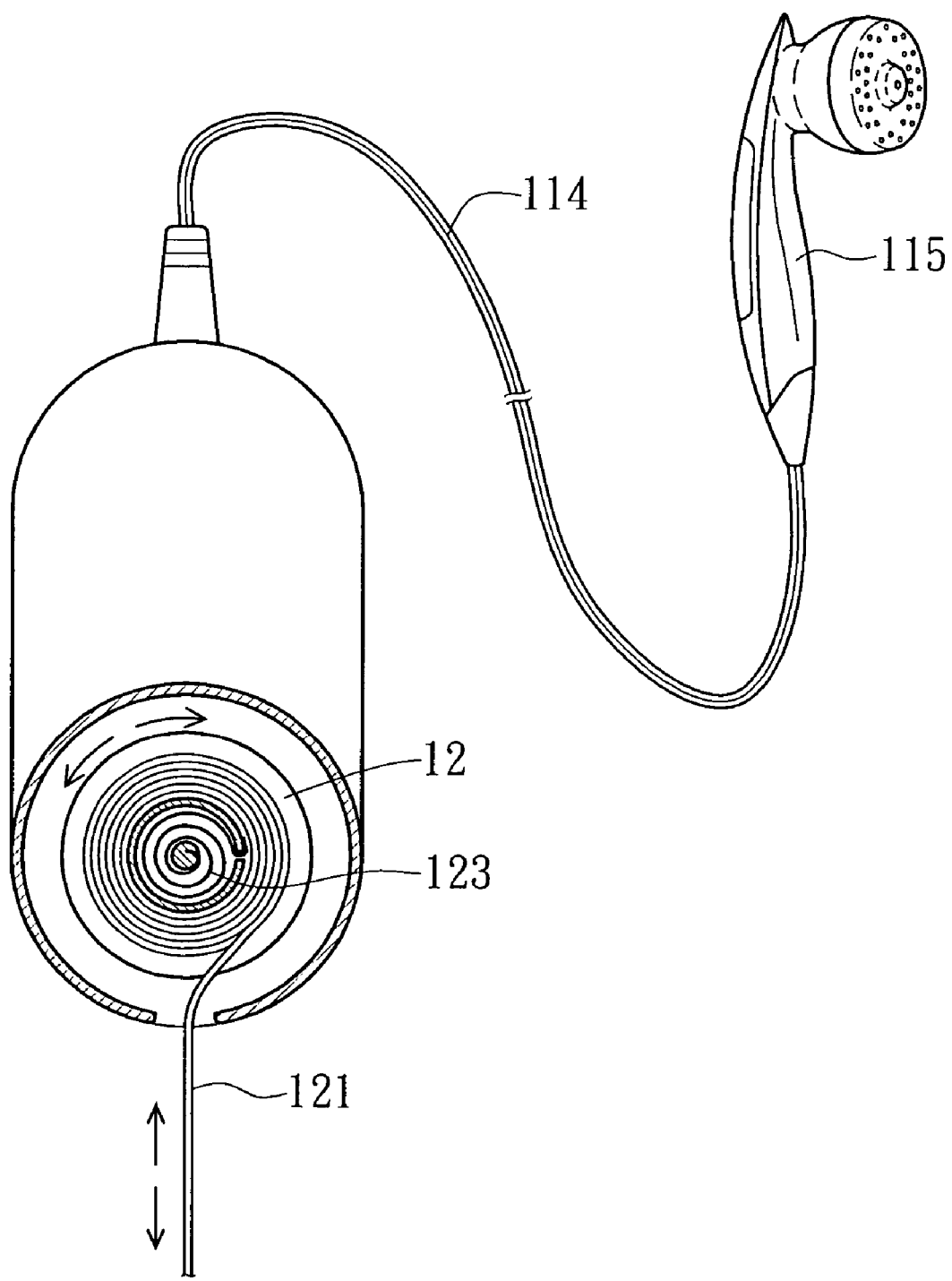
FIG. 8 is a schematic sectional view showing the winding operation of the reel in the main unit of the Bluetooth earphone set in accordance with the fourth embodiment of the present invention.

FIGS. 7 and 8 show a Bluetooth earphone set in accordance with a fourth embodiment of the present invention. According to this design, the cable 114 of the earphone 115 is fixedly connected to the main unit 1, and the cable 121 of the signal connector 122 or 124 is wound round a reel 12 that is fastened to a winding spring 123. The switch 13 of the main unit 1 can be switched between a first position for enabling the earphone 115 to output voice signal that is received wirelessly by the main unit 1 and a second position for enabling the earphone 115 to output voice signal that is received from a cell phone through the cable 121.

Figure 9:
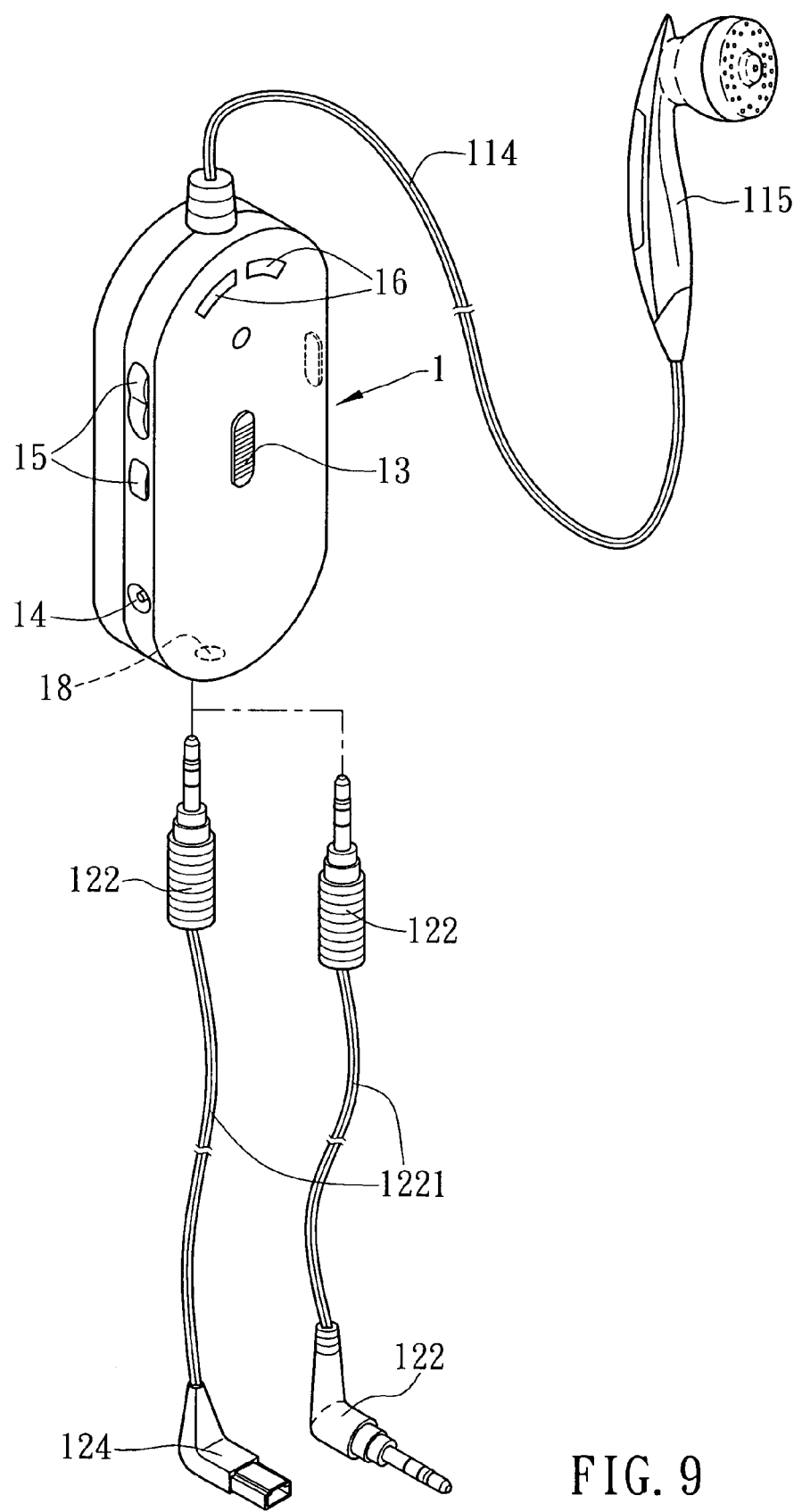
FIG. 9 is a schematic drawing showing a Bluetooth earphone set in accordance with a fifth embodiment of the present invention.

FIG. 9 shows a Bluetooth earphone set in accordance with a fifth embodiment of the present invention. According to this embodiment, the cable 114 of the earphone 115 is fixedly connected to the main unit 1, and the main unit 1 has a signal jack 18 for receiving a detachable signal connector cable 1221, which has a first signal connector 122 at one end for connection to the signal jack 18, and a second signal connector 122 or 124 at the other end for connection to a cell phone. The switch 13 of the main unit 1 can be switched between a first position for enabling the earphone 115 to output voice signal that is received wirelessly by the main unit 1 and a second position for enabling the earphone 155 to output voice signal that is received from a cell phone through the signal jack 18 and the signal connector cable 1221.

Figures 10A, 10B:
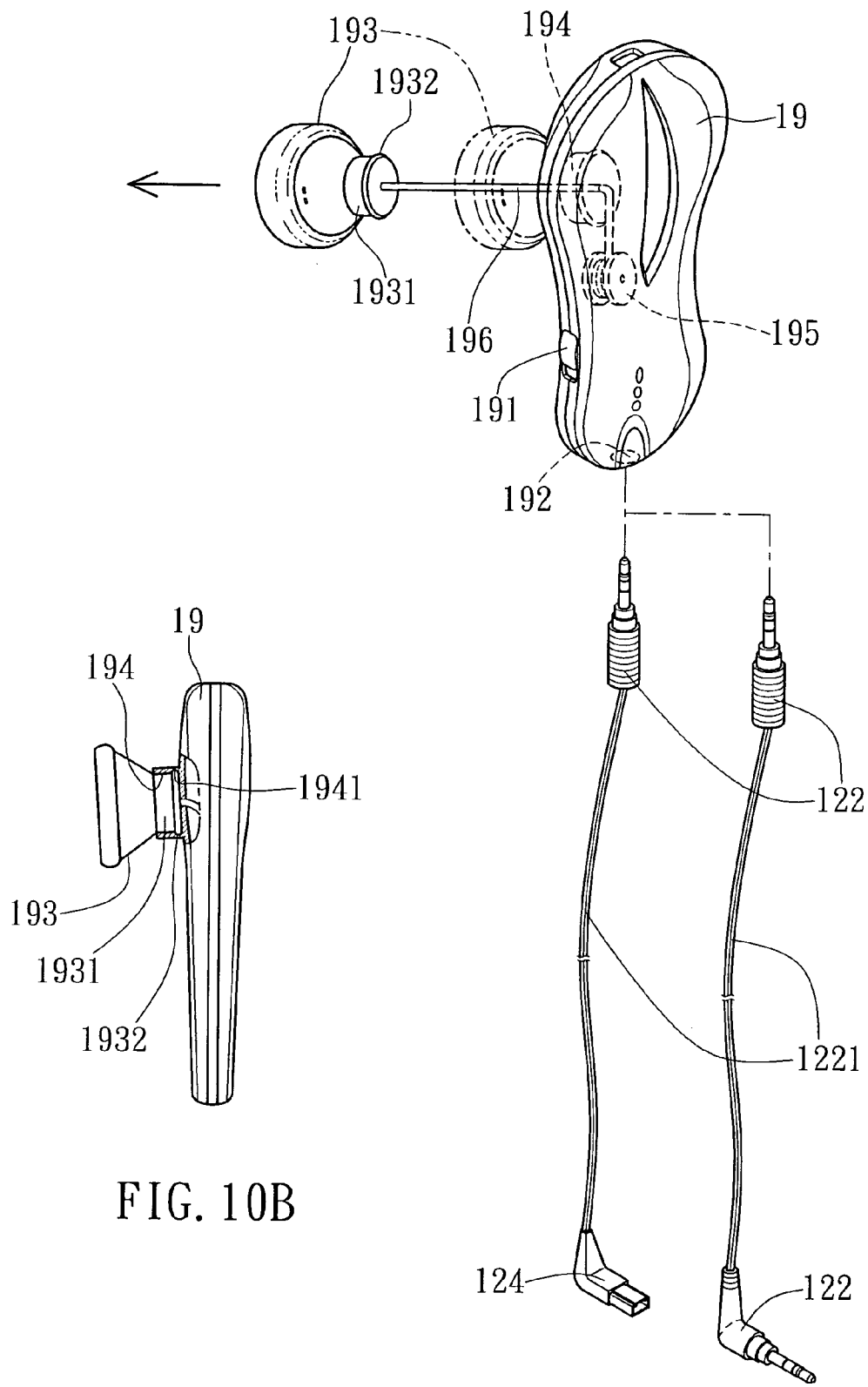
FIG. 10A is a schematic drawing showing a Bluetooth earphone set in accordance with a sixth embodiment of the present invention.
FIG. 10B is a schematic sectional view showing the earphone attached to the main unit in accordance with the sixth embodiment of the present invention.
Figure 11:
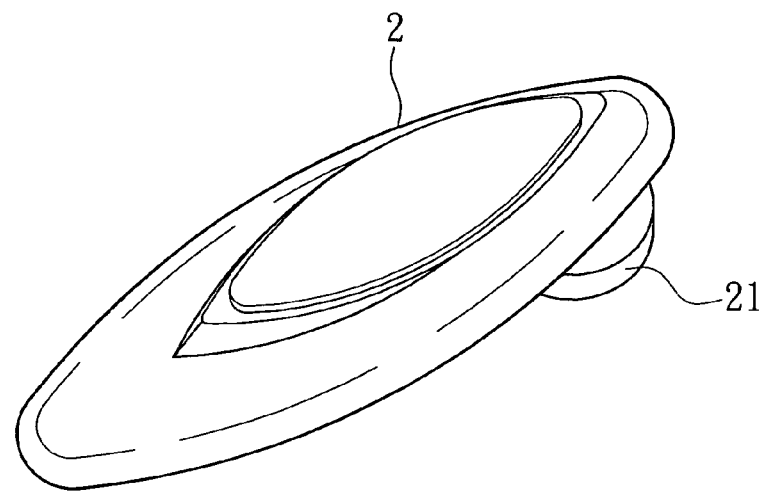
FIG. 11 illustrates a Bluetooth earphone set according to the prior art.
Figure 12:
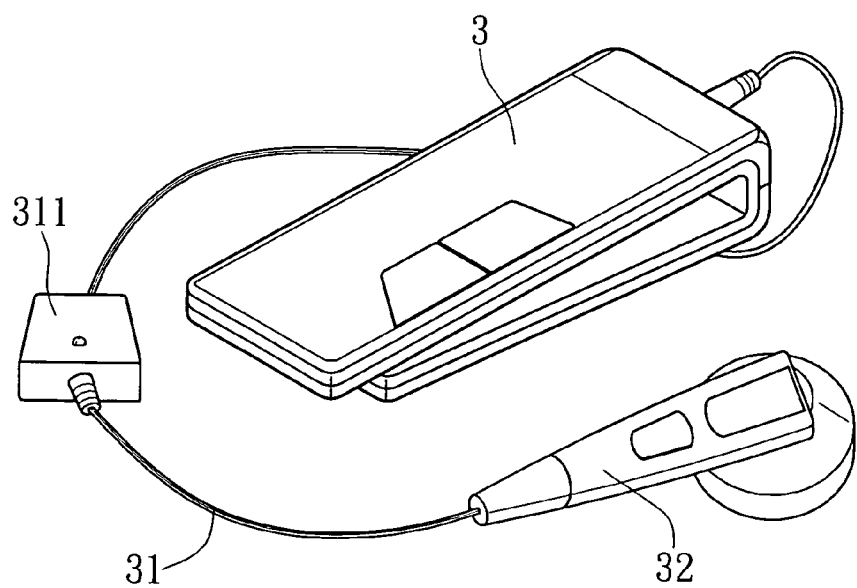
FIG. 12 illustrates another design of Bluetooth earphone set according to the prior art.

FIGS. 10A and 10B show a Bluetooth earphone set in accordance with a sixth embodiment of the present invention. According to this embodiment, the main unit 19 has a reel 195 pivotally mounted on the inside and connected to a winding spring (not shown), a locating hole 194 at one side, a positioning groove 1941 inside the locating hole 194, and a cable 196, which is wound round the reel 195 and has one end connected to the internal circuit of the main unit 1 and the other end extending out of the main unit 1 through the locating hole 194 and terminating in an earphone 193. The earphone 193 has a rear positioning peg 1931. The rear positioning peg 1931 is insertable into the locating hole 194, having a positioning flange 1932 for engaging the positioning groove 1941 in the locating hole 194. The main unit 19 further has a signal jack 182 for receiving a detachable signal connector cable 1221, which has a first signal connector 122 at one end for connection to the signal jack 18, and a second signal connector 122 or 124 at the other end for connection to a cell phone, and a switch 13 that can be switched between switched between a first position where the switch 191 electrically connects the cable 196 to the wireless receiving circuit means of the internal circuit of the main unit 19 for enabling the earphone 193 to output voice signal that is received wirelessly by the main unit 1, and a second position where the switch 191 electrically connects the cable 196 to the signal jack 192 for enabling the earphone 193 to output voice signal that is received from the cell phone through the signal connector cable 1221 and the signal jack 192.

The earphone 193 can be fastened to the locating hole 194 and inserted into the user's ear, keeping the main unit 19 closely attached to the user's ear. Alternatively, the user can disconnect the earphone 193 from the locating hole 194 and then insert the earphone 193 to the ear while keeping the main unit 19 in the pocket.

A prototype of Bluetooth earphone set has been constructed with the features of FIGS. 1~10. The Bluetooth earphone set functions smoothly to provide all the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A Bluetooth earphone set comprising:

a main unit, said main unit comprising an internal circuit, a plurality of function keys and a plurality of operation status indication lights respectively electrically connected to said internal circuit thereof, and a power jack electrically connected to said internal circuit for receiving a battery charger to charge battery means of said internal circuit;

a first winding mechanism and a second winding mechanism respectively mounted in said main unit, said first and second winding mechanisms each comprising a reel formed of a ratchet wheel fitted with a ratchet and a pawl, and a winding spring adapted to bias said reel;

an earphone cable wound round the reel of said first winding mechanism, said earphone cable having a first end electrically connected to said internal circuit of said main unit and a second end extending out of said main unit and terminating in an earphone for voice output of voiced signal received wirelessly by said internal circuit of said main unit;

a signal connector cable wound round the reel of said second winding mechanism, said signal connector cable having a first end electrically connected to said internal circuit of said main unit and a second end extending out of said main unit and terminating in a signal connector connectable to a cell phone to receive voice signal from the cell phone for output through said earphone cable.

2. The Bluetooth earphone set as claimed in claim 1, further comprising switch means adapted to switch voice input contact means of the internal circuit of said main unit to the first end of said signal connector cable.

3. The Bluetooth earphone set as claimed in claim 1, wherein said main unit has a clip at a back side thereof for fastening.

4. The Bluetooth earphone set as claimed in claim 1, wherein said earphone cable further has a second earphone electrically connected in parallel to the second end thereof.

5. The Bluetooth earphone set as claimed in claim 1, further comprising switch means mounted on said main unit and switched between a first position for enabling said earphone to output voice signal that is received from a cell phone wirelessly by said internal circuit of said main unit and a second position for enabling said earphone to output voice signal that is received from a cell phone through said signal connector cable.

6. A Bluetooth earphone set comprising:

a main unit, said main unit comprising an internal circuit, a plurality of function keys and a plurality of operation status indication lights respectively electrically connected to said internal circuit thereof, and a power jack electrically connected to said internal circuit for receiving a battery charger to charge battery means of said internal circuit;

a winding mechanism mounted in said main unit, said winding mechanism comprising a reel formed of a ratchet wheel fitted with a ratchet and a pawl, and a winding spring adapted to bias said reel;

an earphone cable wound round the reel of said winding mechanism, said earphone cable having a first end electrically connected to said internal circuit of said main unit and a second end extending out of said main unit and terminating in an earphone for voice output of voiced signal received wirelessly by said internal circuit of said main unit;

a signal jack mounted on said main unit and electrically connected to the internal circuit of said main unit for voice signal input; and a signal connector cable, said signal connector cable having a first connector at a first end thereof for connection to said signal jack and a second connector at a second end thereof for connection to a cell phone to receive voice signal from the cell phone for output through said earphone cable.

7. The Bluetooth earphone set as claimed in claim 6, further comprising switch means adapted to switch voice input contact means of the internal circuit of said main unit to the first end of said signal connector cable.

8. The Bluetooth earphone set as claimed in claim 6, wherein said main unit has a clip at a back side thereof for fastening.

9. The Bluetooth earphone set as claimed in claim 6, wherein said earphone cable further has a second earphone electrically connected in parallel to the second end thereof.

10. The Bluetooth earphone set as claimed in claim 6, further comprising switch means mounted on said main unit and switched between a first position for enabling said earphone to output voice signal that is received from a cell phone wirelessly by said internal circuit of said main unit and a second position for enabling said earphone to output voice signal that is received from a cell phone through said signal connector cable and said signal jack.

11. A Bluetooth earphone set comprising:

a main unit, said main unit comprising an internal circuit, a plurality of function keys and a plurality of operation status indication lights respectively electrically connected to said internal circuit thereof, and a power jack electrically connected to said internal circuit for receiving a battery charger to charge battery means of said internal circuit;

a winding mechanism mounted in said main unit, said winding mechanism comprising a reel formed of a ratchet wheel fitted with a ratchet and a pawl, and a winding spring adapted to bias said reel;

an earphone cable, said earphone cable having a first end fixedly fastened to said main unit and electrically connected to said internal circuit of said main unit and a second end disposed terminating in an earphone for output of voice signal received wirelessly by said internal circuit of said main unit; and a signal connector cable wound round the reel of said winding mechanism, said signal connector cable having a first end electrically connected to said internal circuit of said main unit and a second end extending out of said main unit and terminating in signal connector for connection to a cell phone to receive voice signal from the cell phone for output through said earphone cable.

12. The Bluetooth earphone set as claimed in claim 11, further comprising switch means adapted to switch voice input contact means of the internal circuit of said main unit to the first end of said signal connector cable.

13. The Bluetooth earphone set as claimed in claim 11, wherein said earphone cable further has a second earphone electrically connected in parallel to the second end thereof.

14. The Bluetooth earphone set as claimed in claim 11, further comprising switch means mounted on said main unit and switched between a first position for enabling said earphone to output voice signal that is received from a cell phone wirelessly by said internal circuit of said main unit and a second position for enabling said earphone to output voice signal that is received from a cell phone through said signal connector cable.

15. A Bluetooth earphone set comprising a main unit, said main unit comprising an internal circuit, a locating hole, and a positioning groove inside said locating hole;

a winding mechanism mounted in said main unit, said winding mechanism comprising a reel formed of a ratchet wheel fitted with a ratchet and a pawl, and a winding spring adapted to bias said reel; and an earphone cable wound round the reel of said winding mechanism, said earphone cable having a first end electrically connected to said internal circuit of said main unit and a second end extending out of said main unit and terminating in an earplug type earphone for voice output of voiced signal received wirelessly by said internal circuit of said main unit, said earplug type earphone having a rear peg insert able into said locating hole, said rear peg having a positioning flange for engaging said positioning groove to secure said earplug type earphone to said locating hole.

16. The Bluetooth earphone set as claimed in claim 15, further comprising a signal jack mounted on said main unit and electrically connected to the internal circuit of said main unit for voice signal input, and a signal connector cable, said signal connector cable having a first connector at a first end thereof for connection to said signal jack and a second connector at a second end thereof for connection to a cell phone to receive voice signal from the cell phone for output through said earphone.

17. The Bluetooth earphone set as claimed in claim 15, further comprising switch means adapted to switch voice input contact means of the internal circuit of said main unit to the first end of said signal connector cable.

18. The Bluetooth earphone set as claimed in claim 15, further comprising switch means mounted on said main unit and switched between a first position for enabling said earphone to output voice signal that is received from a cell phone wirelessly by said internal circuit of said main unit and a second position for enabling said earphone to output voice signal that is received from a cell phone through said signal connector cable and said signal jack.

* * * * *